United States Patent

[11] 3,560,696

| [72] | Inventors | Vladimir Ivanovich Grinenko<br>Ulitsa Inzhenernaya, 10, Korpus 1, Kv.10;<br>Viktor Viktorovich Shefel, Vyatskaya<br>Ulitsa, 1, Kv. 86; Viktor Petrovich Rybkin,<br>Ulitsa Standartnaya, 3, Kv. 3; Vladimir<br>Petrovich Bogachev, Ulitsa Fonvizina, 14,<br>Kv. 40, Moscow, U.S.S.R. |
|------|-----------|---|
| [21] | Appl. No. | 738,682 |
| [22] | Filed | June 20, 1968 |
| [45] | Patented | Feb. 2, 1971 |
| [32] | Priority | June 26, 1967 |
| [33] | | U.S.S.R. |
| [31] | | 1,166,263 |

[54] DEVICE FOR ORBITAL WELDING OF BUTT JOINTS OF PIPES
3 Claims, 7 Drawing Figs.

| [52] | U.S. Cl. | 219/60 |
|------|----------|--------|
| [51] | Int. Cl. | B23k 9/02 |
| [50] | Field of Search | 219/59, 60, 60.1, 125 |

[56] References Cited
UNITED STATES PATENTS

| 2,894,111 | 7/1959 | McNutt | 219/60 |
| 3,135,850 | 6/1964 | Scheller et al. | 219/60 |
| 3,193,656 | 7/1965 | Bell et al. | 219/60 |

*Primary Examiner*—J. V. Truhe
*Assistant Examiner*—L. A. Schutzman
*Attorney*—Waters, Roditi, Schwartz and Nissen ABSTRACT: A device for the orbital welding of butt joints of pipes. The device comprises a body adapted for being removably secured on one of the pipes being welded. Guides are provided which extend in longitudinal direction in the body. The pipe is arranged along the guides. A slide block is mounted on the guides so that displacement of the slide block along the pipe axis can be effected. A drive is mounted on the stationary body and is adapted to displace the slide block on the guides. Circular guides are provided on the slide block and are arranged transversely with respect to the guides. A faceplate is mounted in the circular guides and supports a torch which orbits around the pipes at the butt joint thereof.

DEVICE FOR ORBITAL WELDING OF BUTT JOINTS OF PIPES

The present invention relates to devices for the orbital welding of butt joints of pipes and which can be utilized, for example, in nonconsumable electrode gas shielded welding.

There is known a prior art device for nonconsumable electrode gas shielded orbital welding of butt joints of pipes.

Said known device has a body secured on one of the pipes being welded, while the torch is displaced along the butt joint with the aid of a faceplate revolving along its guides secured on the body. The faceplate is connected with the slide block of a mechanism for displacing the torch across the butt joint of the pipes being welded.

The above-described known device is disadvantageous in that the slide block of the mechanism for displacing the torch across the butt joint is positioned on the faceplate which revolves in the course of welding. This hampers the adjusting displacement of the torch in the course of welding, since the slide block rotates together with the faceplate. It is likewise inconvenient to adjust the position of the torch across the butt joint and during intervals between weld passes, since the slide block control lever is placed in the immediate proximity to the pipes being welded and the torch, as a result of which the operator often burns his hands when displacing the torch across the butt joint. Operation is especially inconvenienced when using said known device under conditions of crowded assembly space, e.g. when adjacent pipes or other parts are placed too close to the faceplate. Besides, the arrangement of the slide block on the faceplate brings about an increase of dimensions of rotating parts of the device, thus lessening the possibility of employing the latter under conditions of crowded space.

It is an object of the present invention to provide a device for the orbital welding of butt ends of pipes which is more convenient in operation than the known devices.

Another object of the invention is to provide a device for the orbital welding of butt joints of pipes which can be successfully employed under conditions of crowded assembly space, e.g. for welding pipes of heating surfaces of boilers at heat and electric power plants.

The above objects of the present invention may be accomplished with the aid of a device for orbital welding of butt joints of pipes, whose body is coupled to one of the weld pipes and carries longitudinal guides accommodating a slide block displaced along the axis of the weld pipe by means of a drive disposed on a stationary body. The slide block carries ring-shaped guides arranged across the longitudinal guides, a faceplate being provided on said ring-shaped guides and carrying a torch, said faceplate being forced to perform movement.

It is most expedient to use as the drive for displacing the slide block a driving shaft terminating in a handle, and a pair of elements one of which is arranged on the slide block, and the other of which is movably mounted in the body and connected to said driving shaft via a bevel gear or worm gear pair.

A favorable solution may be arrived at in the case when the drive for the displacement of the slide block is fashioned as an angle lever hingedly secured on the body, one arm of said lever cooperating with said slide block, and a pair of elements one of which is connected with the other arm of said angle lever, whereas the other element of this pair is mounted on a driving shaft terminating in a handle whose opposite end is threaded.

With a view to reducing overall dimensions of the device in the direction of the axis of the pipes being welded, it is most expedient that the driving shaft of the mechanism for securing the body on one of the pipes being welded be made hollow to accommodate the driving shaft of the slide block drive.

Given hereinbelow is a detailed description of exemplary embodiments of the device according to the present invention, reference being had to the accompanying drawings, wherein.

Figure 1:
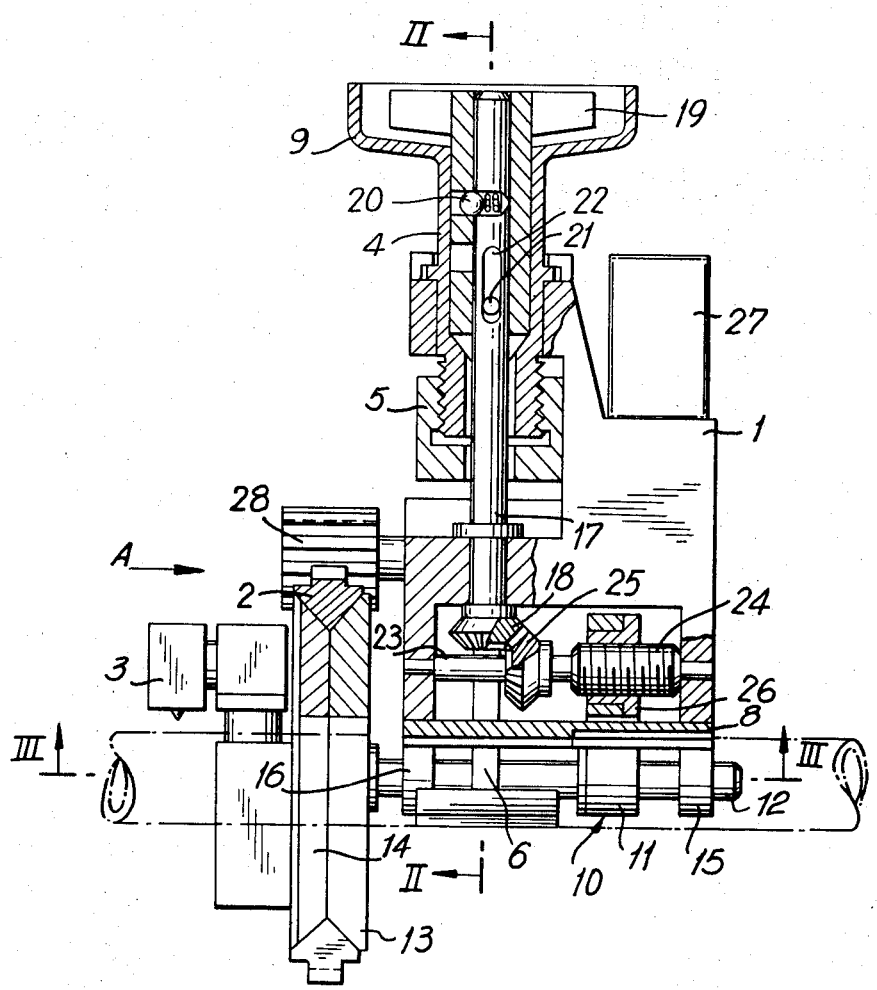
FIG. 1 shows a general view of the device for orbital welding of butt joints of pipes, according to the present invention, in cross section.
Figure 2:
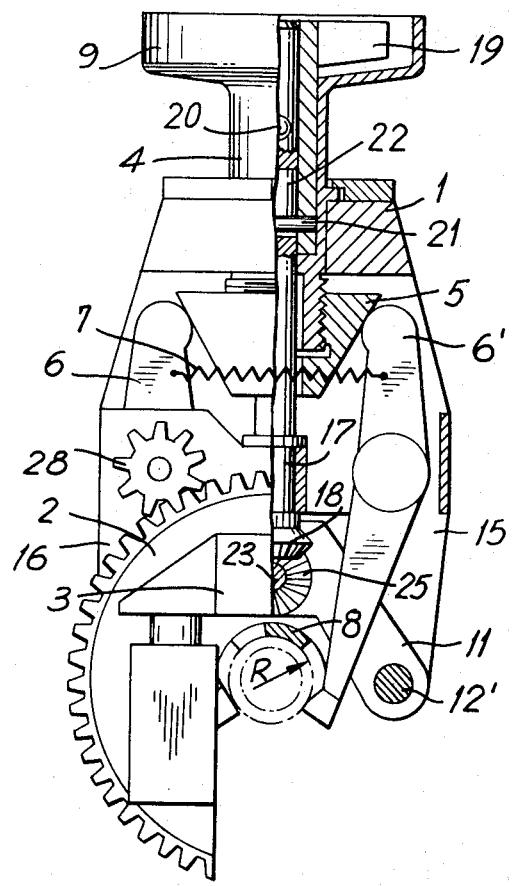
FIG. 2 is a view on arrow A of FIG. 1, the right-hand half of the device of the invention being shown in section on line II–II in FIG. 1.
Figure 3:
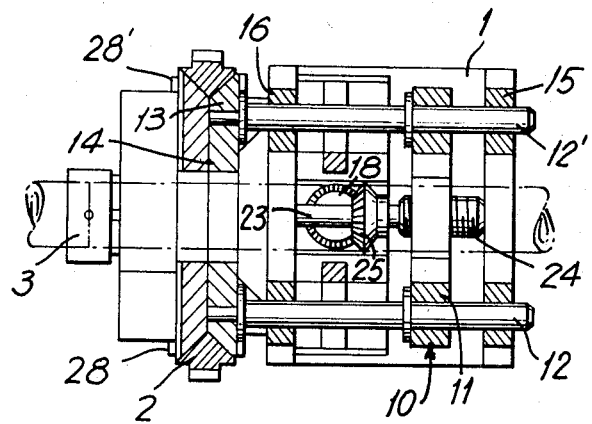
FIG. 3 is a section on line III–III of FIG. 1 (the insert is conventionally removed)

Now referring to FIGS. 1, 2 and 3, the device for orbital welding of butt joints of pipes comprises a body 1, a mechanism for securing the body on one of the pipes being welded (the latter being shown in the drawings in a dash line), a faceplate 2 with a torch 3, a mechanism for displacing the torch across the butt joint and a drive for rotating the faceplate.

Said mechanism for securing the body has a driving shaft 4 arranged in the body 1 and made hollow. Set on the motion thread of the lower end of said driving shaft 4 is a nut 5 whose external surface is wedge-shaped.

Hingedly secured in the body 1 are levers 6 and 6' (FIG. 2) whose upper ends are pressed against the nut 5 with the aid of a spring 7. The lower ends of the levers 6 and 6' are made as lugs. For mounting the present device on a pipe provision is made in the lower portion of the body 1 of an insert 8 made changeable and varying in size depending upon the diameter of the pipes being welded. The upper end of the driving shaft 4 carries a handle 9.

The mechanism for displacing the torch across the butt joint comprises a slide block 10 (FIG. 1) and its drive. The slide block consists of a crossmember 11 and cylindrical guides 12 and 12' (FIG. 3) secured thereto, to the ends of which latter guides there are secured ring-shaped guides 13 and 14 of the faceplate 2.

The cylindrical rods 12 and 12' are passed through openings provided in the jaws 15 and 16 of the body 1, said openings serving as longitudinal guides of the slide 10.

The drive of the slide block 10 comprises a driving shaft 17 (FIG. 1) as well as tooth and screw pairs.

The driving shaft 17 of the drive of the slide block 10 has on its lower end a driving gear 18 of the bevel pair, while on its upper end there is telescopically set a handle 19 checked in its two extreme positions with the aid of a ball lock 20 inserted in the above-mentioned driving shaft 17.

The displacement of the handle 19 is limited with the aid of a pin 21 passing through a groove 22 in the driving shaft 17.

One of the elements of the screw pair is fashioned as a shaft 23 movably mounted in the cheeks 15 and 16 of the body 1 and having screw thread 24 and bevel gear 25. The other element of the screw pair is a nut 26 secured on the crossmember 11 of the slide block 10.

The drive for rotating the faceplate 2 comprises an electric motor 27 and a reducing gear (not shown in the drawings) arranged in the body 1 and terminating in driving gears 28 and 28'.

The faceplate 2 adapted to perform forced displacement along the ring-shaped guides 13 and 14, is engaged by its toothing with the driving gears 28 and 28'. In the faceplate 2 (FIG. 2) and the ring-shaped guides 13, 14 provision is made of radial cuts for mounting the device according to the present invention on a pipe.

Figure 4:
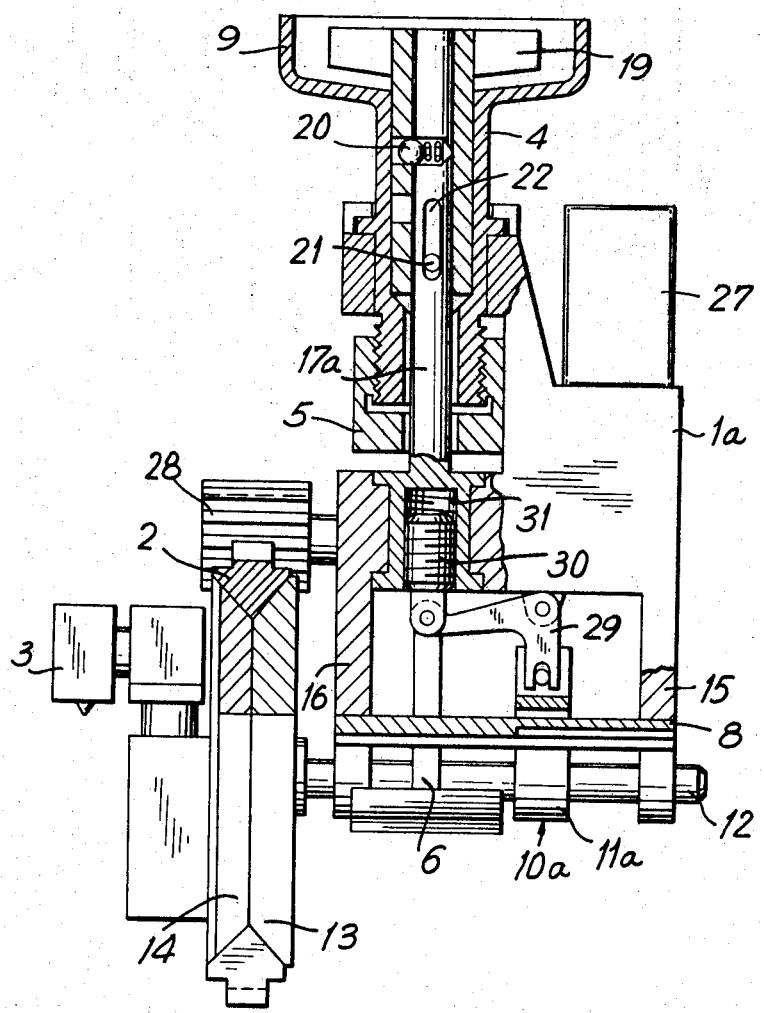
FIG. 4 illustrates another embodiment of the device for welding butt joints of pipes, according to the present invention, in cross section.

The device shown in FIG. 4 comprises basically the same units as the above-described device. However, the drive of the slide block 10a is fashioned as an angle lever 29 and a screw pair. The lever 29 is hingedly secured in the body 1a, its one arm being connected with the crossmember 11a of the slide block 10a, the crossmember 11a, and the other—with a screw 30 of the screw pair. The lower end of the driving shaft 17a of the drive of the slide block 10a is provided with internal thread 31, while the opposite end of the latter shaft is fitted with the handle 19.

Figure 5:
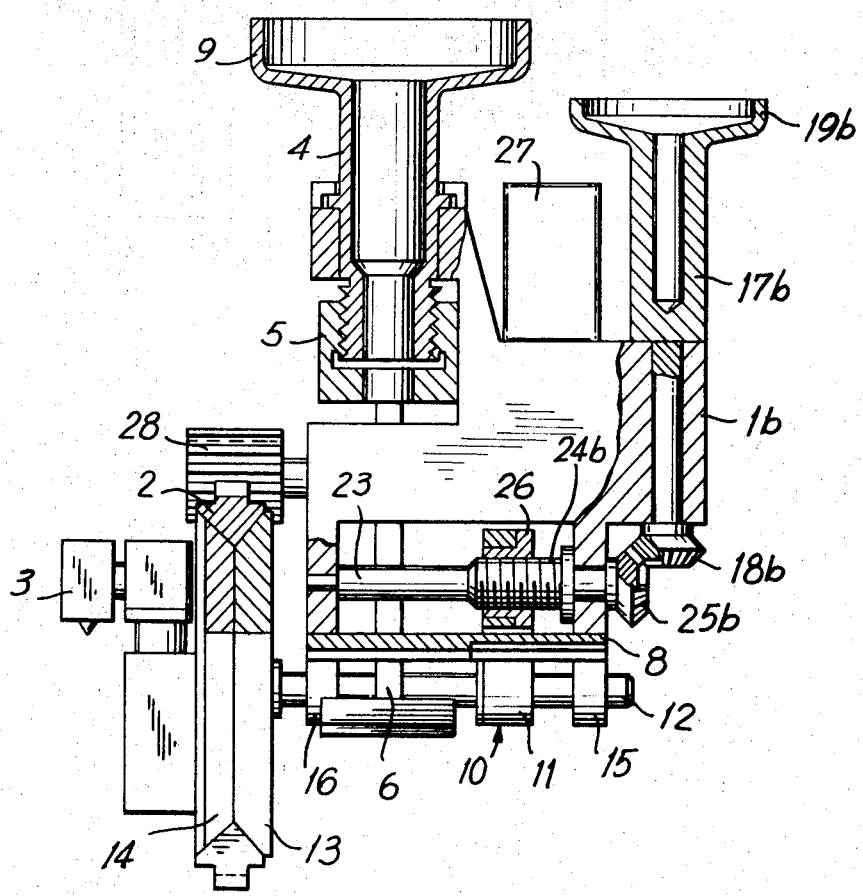
FIG. 5 illustrates still another embodiment of the device for welding butt joints of pipes, according to the present invention, in cross section.

For operation under conditions of less crowded assembly space there may be employed the version of the device embodiment shown in FIG. 5, which consists basically of the same units as the devices presented in FIGS. 1, 2, 3 and 4, the only difference being that the driving shaft 17b of the slide block drive is arranged in the rear portion of the body 1b and outside of the driving shaft 4 of the mechanism for securing the body on a pipe.

The designation of parts shown in positions 18b, 19b, 23b, 24b and 25b is analogous to that of the respective parts 18, 19, 23, 24 and 25 shown in FIGS. 1, 2, 3, however, said former parts are fashioned somewhat differently in accordance with the design peculiarities of the device embodiment shown in FIG. 5.

Figure 7:
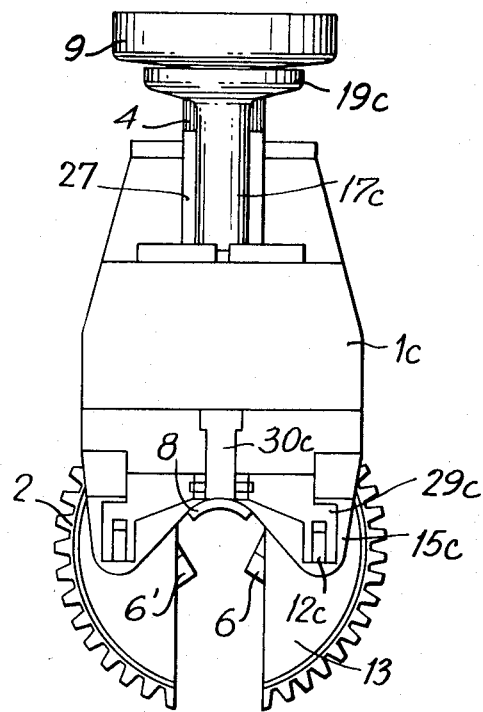
FIG. 7 is a view on arrow B of FIG. 6.
Figure 6:
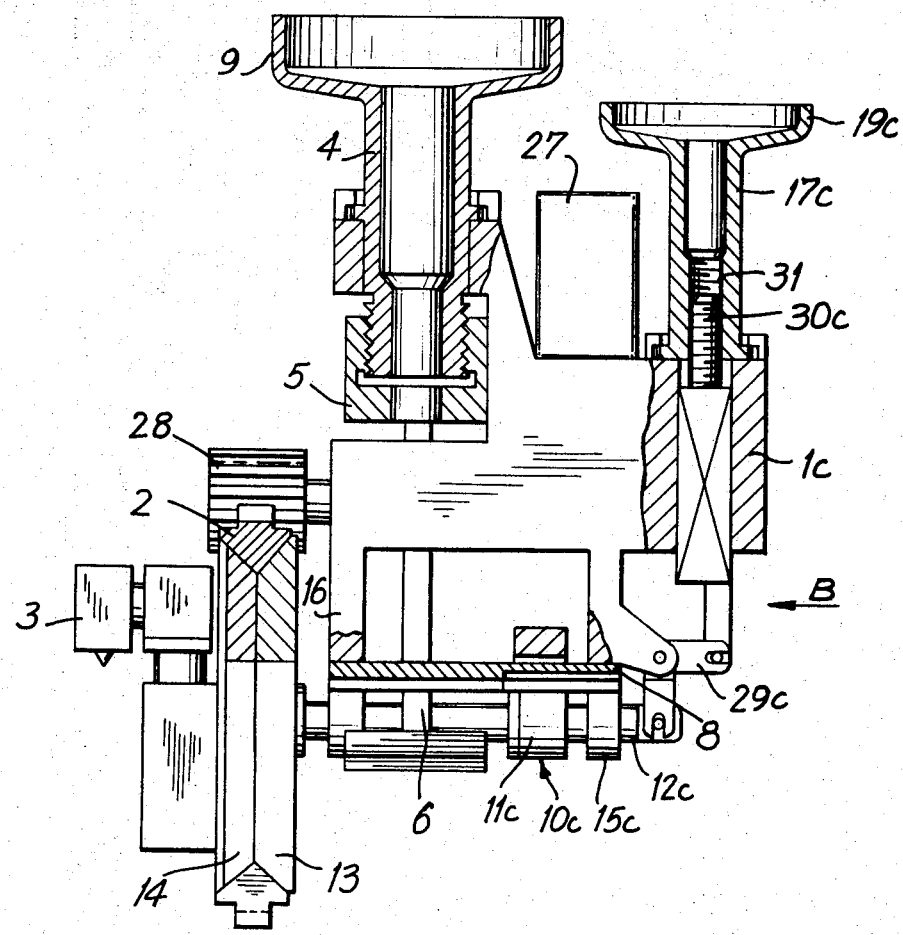
FIG. 6 illustrates one more embodiment of the device for welding butt joints of pipes, according to the present invention, in cross section.

The device shown in FIGS. 6 and 7, similar to that shown in FIG. 4, has the angle lever 29c hingedly secured in the body 1c. Its one arm is connected with the screw 30c of the screw pair, and the other—with the crossmember 11c of the slide block 10c.

The designation of parts shown in positions 12c, 15c, 17c and 19c is analogous to that of the respective parts 12, 15, 17 and 19 shown in FIG. 4, however, said former parts are fashioned somewhat differently in accordance with the design peculiarities of the device embodiment shown in FIGS. 6 and 7.

Prior to mounting the device of the invention on a pipe being welded, the cut in the faceplate 2 (FIG. 1) is brought into coincidence with the cuts in its ring-shaped guides 13 and 14. To this end, the electric motor 27 is switched on, whose rotation is imparted to the faceplate 2 via driving gears 28 and 28'. The device of the invention is set on the pipe, passing the latter through the cuts, until thrust against the insert 8.

The handle 9 is turned, whereby the shaft 4 turns, and the nut 5 performs progressive motion along the thread of the shaft 4, setting apart the upper ends of the levers 6 and 6'. The latter turn and press with their lugs the pipe against the insert 8 thus fixing the device in the operating position. With a view to guiding the welding torch 3 precisely on a butt joint made ready for welding, the handle 19 of the driving shaft 17 of the slide block drive in the device shown in FIGS. 1, 2 and 3 is telescoped from the handle 9 of the mechanism for securing the device until the pin 21 is thrust against the upper end of the groove 22. The ball lock 20 keeps the handle 19 in the uppermost position. Then, by turning the handle 19, the driving shaft is rotated together with the driving bevel gear 18 which, cooperating with the driven gear 25, transmits rotation to the shaft 23. Thread 24 of the shaft 23, in its turn, cooperating with the nut 26 of the crossmember 11, displaces the slide block 10.

The cylindrical rods 12 and 12' slide in the openings of the cheeks 15 and 16 of the body 1. Displaced together with the slide block 10 is the faceplate 2 with the welding torch 3. Then, protective gas is supplied to the torch, a welding arc is struck and the motor 27 of the drive for rotating the faceplate is switched on. The driving gears 28 and 28', cooperating with the toothing of the faceplate 2, make the latter rotate along the ring-shaped guides 13 and 14. Both driving gears 28 and 28' rotate synchronously. The presence of two driving gears is accounted for by the necessity of continuous rotation of the faceplate 2. When one of said u ving gears falls in the cut of the faceplate 2, the latter remains in mesh with the other gear, and vice versa. The adjustment of the position of the torch 3 across the butt joint in the process of welding is effected by turning the handle 19 and shifting the slide block 10. The welding process over, the cut in the faceplate 2 is brought into coincidence with the cuts in the ring-shaped guides 13 and 14, while the handle 19 of the slide block drive is sunk in the handle 9 of the mechanism for securing the body on the pipe. The handle 19 is held in the sunk position by the ball lock 20.

Then, by turning the handle 9, the nut 5 is moved up with the aid of the screw thread of the shaft 4.

The spring 7 brings together the upper ends of the levers 6 and 6' removing their lugs from the pipe, whereupon the device is removed from the latter.

The adjustment of the position of the torch 3 across the butt joint, when employing the device shown in FIG. 4, is effected in the same manner as that of the device shown in FIGS. 1, 2 and 3. The handle 19 is telescoped from the handle 9 of the mechanism for securing the device and, by turning the former, the nut 30 is displaced, which, in its turn, causes the displacement of one arm of the angle lever 29, while the second arm of the latter cooperating with the crossmember 11a of the slide block 10a displaces the faceplate 2 with the torch 3.

The device shown in FIG. 5 operates in accordance with the same principle as described hereinabove. However, since the driving shaft 17b of the slide block drive is arranged outside the driving shaft 4 of the mechanism for securing the device, the operation of telescoping and sinking the handle 19b of the slide block drive becomes superfluous.

The adjustment of the position of the torch 3 across the butt joint, when operating the device shown in FIGS. 6 and 7, is likewise effected by turning the handle 19c of the driving shaft 17c. Then, the nut 30c is displaced upwards or downwards along the internal thread 31 (FIG. 6) of the driving shaft 17c and acts upon one arm of the lever 29c, whereat the other arm of the latter causes the displacement of the slide block 10c together with the ring-shaped guides 13 and 14 of the faceplate 2, the faceplate 2 and the welding torch 3, all connected to said slide block 10. All the remaining operations are effected in the same manner as when employing the devices shown in FIGS. 1, 2, 3 and 4.

The arrangement of the slide block on the body of the device according to the present invention makes it possible to facilitate the displacement of the torch across the butt joint as compared to prior art designs. This feature is particularly advantageous when operating under conditions of crowded assembly space.

The arrangement of the driving shaft of the mechanism for displacing the torch across the butt joint inside the hollow driving shaft of the mechanism for securing the device on a pipe makes it possible to reduce by 20 to 40 percent the overall dimensions of the device in the direction of the pipe axis and, consequently, to employ the device according to the present invention under conditions of crowded assembly space less favorable in comparison with prior art designs.

When describing the exemplary embodiments of the present invention, concrete narrow terminology has been used for the sake of clarity. However, the invention is not limited by the terms adopted, and it should be borne in mind that each of these terms embraces all the equivalent elements working analogously and used to solve similar problems.

Although the present invention has been described hereinabove in connection with preferred embodiments thereof, it is to be understood that various alterations and modifications may take place without departing from the true spirit and scope of the present invention, as those skilled in the art will easily understand.

Such alterations and modifications are to be considered as falling within the essence and scope of the present invention and the appended claims.

We claim:

1. A device for orbital welding of butt joints of pipes, comprising: a body adapted for being immovably secured on one of the pipes being welded; guides extending in a longitudinal direction in said body, along which guides said pipe is arranged; a slide block mounted on said guides of said body so that displacement of the slide block along the pipe axis can be effected; a drive mounted on said stationary body and adapted to displace said slide block on said guides; circular guides on said slide block, arranged transversely with respect to said guides; a faceplate mounted in said circular guides and adapted for being positively displaced in the latter and a torch mounted in said faceplate.

2. A device as claimed in claim 1, wherein the drive for displacing the slide block on said guides includes a screw pair including one member arranged on the slide block, and another member movably mounted on said body, said device further including a drive shaft, a handle and toothed gearing connecting said other member to said drive shaft, the drive shaft being arranged at an angle to the screw pair, said handle being connected to said shaft for rotating the latter manually.

3. A device as claimed in claim 1, comprising a screw pair including axially movable and immovable members and wherein said drive for displacing the slide block on said longitudinal guides includes a lever pivotally secured on the body, said lever including one arm which cooperates with said slide block and another arm cooperating with the axially movable member of a screw pair, said device further including a drive shaft and a handle, the axially immovable member of said screw pair being secured to said drive shaft, said shaft being connected to said handle for being rotated manually.